US011354297B2

(12) United States Patent
Bak et al.

(10) Patent No.: US 11,354,297 B2
(45) Date of Patent: Jun. 7, 2022

(54) DETECTING POSITIVITY VIOLATIONS IN MULTIDIMENSIONAL DATA

(71) Applicant: International Business Machines Corporation, Armonk, NY (US)

(72) Inventors: Peter Bak, Yokneam Ilit (IL); Ehud Karavani, Giv'at Ye'arim (IL); Yishai Shimoni, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 16/533,810

(22) Filed: Aug. 7, 2019

(65) Prior Publication Data

US 2021/0042287 A1 Feb. 11, 2021

(51) Int. Cl.
| | | |
|---|---|---|
| *G06F 16/25* | (2019.01) | |
| *G06F 30/20* | (2020.01) | |
| *G06F 16/23* | (2019.01) | |
| *G06F 111/10* | (2020.01) | |

(52) U.S. Cl.
CPC ........ *G06F 16/2365* (2019.01); *G06F 16/252* (2019.01); *G06F 30/20* (2020.01); *G06F 2111/10* (2020.01)

(58) Field of Classification Search
None
See application file for complete search history.

(56) References Cited

U.S. PATENT DOCUMENTS

| | | | | |
|---|---|---|---|---|
| 7,310,624 | B1 * | 12/2007 | Aggarwal | ............... G06F 16/30 |
| | | | | 706/45 |
| 7,924,283 | B1 * | 4/2011 | Hao | ....................... G06T 11/206 |
| | | | | 345/440 |
| 2007/0198597 | A1 * | 8/2007 | Betz | .................... G06F 16/2458 |
| 2007/0198598 | A1 * | 8/2007 | Betz | .................... G06F 16/2458 |
| 2017/0116297 | A1 * | 4/2017 | Wittenburg | ........... G06F 40/137 |
| 2017/0140417 | A1 | 5/2017 | Li et al. | |

OTHER PUBLICATIONS

Karavani et al. "A discriminative approach for finding and characterizing positivity violations using decision trees". arXiv:1907.08127. Published Jul. 18, 2019. URL Link: <https://arxiv.org/abs/1907.08127>. Accessed Dec. 2021. (Year: 2019).*

(Continued)

*Primary Examiner* — Irene Baker
(74) *Attorney, Agent, or Firm* — Barry D. Blount

(57) ABSTRACT

An example computer-implemented method includes receiving, via a processor, a dataset of objects to be tested for positivity violations. The method includes generating, via the processor, a feature matrix based on features extracted from the objects. The method also includes generating, via the processor, decision trees to group the objects into homogenous groups based on entropy and generate a random forest to compute consistency of violations. The method further includes detecting, via the processor, a positivity violation based on an entropy threshold, a consistency threshold, and a statistical significance threshold being exceeded. The method further includes generating, via the processor, an interactive representation to display the positivity violation.

19 Claims, 9 Drawing Sheets

(56) References Cited

OTHER PUBLICATIONS

Spertus et al. "Bayesian Propensity Scores for High-Dimensional Causal Inference: A Comparison of Drug-Eluting to Bare-Metal Coronary Stents". arXiv:1710.03138. Published Oct. 9, 2017. URL Link: <https://arxiv.org/pdf/1710.03138.pdf>. Accessed Dec. 2021. (Year: 2017).*

Traskin, Mikhail et al., "Defining the Study Population for an Observational Study to Ensure Sufficient Overlap: A Tree Approach," Department of Statistics, The Wharton School, University of Pennsylvania, Philadelphia, PA 19104, USA, 2011, pp. 29.

Petersen, Maya L et al., "Diagnosing and Responding to Violations in The Positivity Assumption," Stat Methods Med Res. Feb. 2012, pp. 31.

Wang, Mary Ying-Fang et al., "Augmented Weighted Estimators Dealing with Practical Positivity Violation to Causal Inferences in a Random Coefficient Model," Psychometrika, Mar. 2019, pp. 21.

Crump, Richard K et al., "Dealing with Limited Overlap in Estimation of Average Treatment Effects," Biometrika, vol. 96, Issue 1, Mar. 2009, pp. 23.

Linden, Ariel, "Graphical displays for assessing covariate balance in matching studies," Journal of Evaluation in Clinical Practice 21, 2015, pp. 242-247.

* cited by examiner

FIG. 4
400

DETECTING POSITIVITY VIOLATIONS IN MULTIDIMENSIONAL DATA

BACKGROUND

The present techniques relate to detecting positivity violations. More specifically, the techniques relate to detecting positivity violations in multidimensional data.

SUMMARY

According to an embodiment described herein, a system can include processor to receive a feature matrix including a number of features associated with a number of objects to be tested for positivity violations. The processor can also further generate a decision tree to group the objects into homogenous groups based on entropy and generate a random forest to compute consistency of violations. The processor can also detect a positivity violation based on an entropy threshold, a consistency threshold, and a statistical significance threshold being exceeded. The processor can also further generate an interactive representation to display the positivity violation.

According to another embodiment described herein, a method can include receiving, via a processor, a dataset of objects to be tested for positivity violations. The method can further include generating, via the processor, a feature matrix based on features extracted from the objects. The method can also further include generating, via the processor, decision trees to group the objects into homogenous groups based on entropy and generate a random forest to compute consistency of violations. The method can also include detecting, via the processor, a positivity violation based on an entropy threshold, a consistency threshold, and a statistical significance threshold being exceeded. The method can also include generating, via the processor, an interactive representation to display the positivity violation.

According to another embodiment described herein, a computer program product for detecting positivity violations can include computer-readable storage medium having program code embodied therewith. The computer readable storage medium is not a transitory signal per se. The program code executable by a processor to cause the processor to receive a dataset of objects to be tested for positivity violations. The program code can also cause the processor to generate a feature matrix based on features extracted from the objects. The program code can also cause the processor to generate decision trees to group the objects into homogenous groups based on entropy and generate a random forest to compute consistency of violations. The program code can also cause the processor to detect a positivity violation based on an entropy threshold, a consistency threshold, and a statistical significance threshold being exceeded. The program code can also cause the processor to generate an interactive representation to display the positivity violation.

BRIEF DESCRIPTION OF THE SEVERAL VIEWS OF THE DRAWINGS

FIG. 4 is an example rule table according to embodiments described herein;

DETAILED DESCRIPTION

Figure 1:
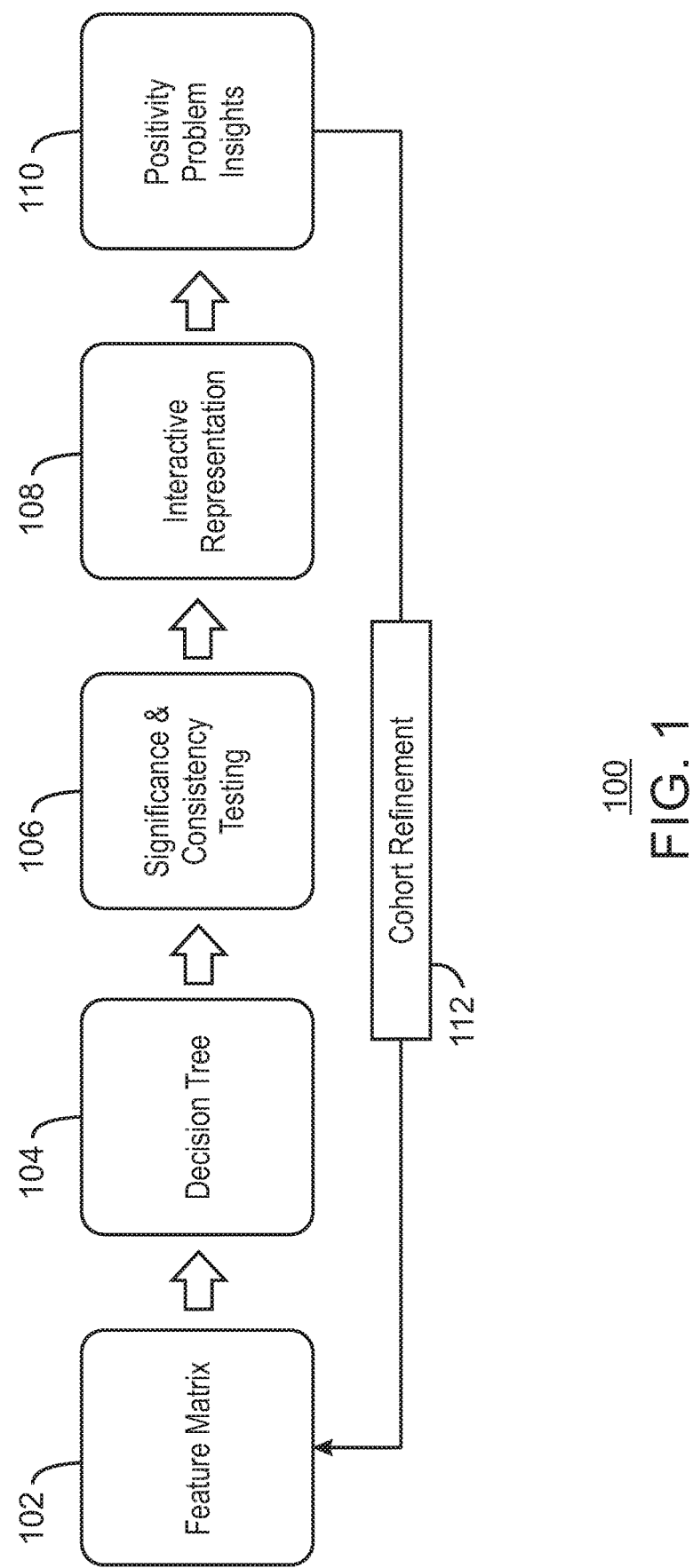
FIG. 1 is a block diagram of an example pipeline for detecting positivity violations in multidimensional data.

Causal inference is the field dedicated to estimating causal effects of some interventions from real world retrospective data. At its most basic concept, causal inference includes estimating an effect of an intervention by comparing two groups, one that received the intervention, and another that received a different intervention, such as receiving a placebo or no intervention. However, three assumptions are used for this derived quantity to be interpreted as a causal effect, namely, no unmeasured confounders, consistency, and positivity. Positivity is the assumption that every sample has some positive probability to be assigned to every treatment. In order to determine the effect of the intervention, the effects of other baseline attributes of the test objects may thus be controlled. Thus, two groups may be constructed that have similar distributions of baseline attributes to reduce the effects the baseline attributes. However, some constructed groups may not have similar distributions of one or more baseline attributes. This lack of covariate overlap between groups is referred to herein as a positivity violation. Violation of positivity, also known as non-positivity, or lack of covariate overlap, suggests that there is some combination of features for which the probability to be treated is either 1 or 0, and hence, deterministic. This implies that that particular subspace of covariates is populated solely by samples from one group. This, in turn, makes it impossible, or much less probable, to infer the counterfactual outcome for these samples, as there is no data from the other group to infer from. For example, a particular subpopulation within a selected cohort may not include any samples affected by a particular potential cause to be examined. A cohort is a data-set of both test and control objects that share a particular event. Thus, some cohorts may have positivity violations that make the test group incomparable with the control group contaminating the effect estimated for an intervention with background noise.

Moreover, objects in the dataset may have many dimensions of attributes and even more particular combinations of attributes, some of which may be present in one group and not have any counterpart in another group. As one simple example, in a control trial, a treatment group may be enriched in a particular feature combination, while the control group may have no test objects with this particular feature combination. Since the control group does not have any test objects with the particular feature combination, this particular feature combination may not be controlled in the comparison to determine the effects of the intervention. Thus, any combination of a multitude of attributes may actually have a positivity violation and thus effects on a comparison. Manually analyzing each and every combination of a multidimensional space may be very cumbersome, if not impossible to do in a lifetime. Moreover, even a brute force analysis of all possible combinations and their effects may use substantial resources and take a significant amount of time to complete. For example, there may be millions of possible combinations of features to be tested for positivity violations. In addition, breaking down analysis into a one dimensional analysis may not be able to detect positivity violations that only exist in a multidimensional space. As the complexity of covariate spaces increases, by being of both high dimensional and of various types with mixing continuous, binary and categorical variables, this task becomes highly challenging.

According to embodiments of the present disclosure, particular machine learning techniques are described to identify subpopulations of the data on which additional machine learning may be performed. For example, the subpopulations may be free of positivity violations with respect to one or more other subpopulations. An example system includes a processor to receive a feature matrix including a number of features associated with a number of objects to be tested for positivity violations. The processor is to generate a decision tree to group the objects into homogenous groups based on entropy and generate a random forest to compute consistency of violations. The processor is to detect a positivity violation based on an entropy threshold, a consistency threshold, and a statistical significance threshold being exceeded. The processor is to also generate an interactive representation to display the positivity violation.

Thus, embodiments of the present disclosure enable efficient identification and characterization of sub-populations in one group that have no counterpart in another group to be compared. In this manner, a cohort refinement may automatically be executed. For example, once the positivity violations are identified, the subpopulation with combinations of features causing the positivity violation may be removed. The refined cohort may then be used to train a machine learning algorithm for detecting causality in data sets. By removing positivity violations from the cohort used to train the machine learning algorithm, the accuracy of the machine learning algorithm of detecting causality may be improved.

In some examples, the causal question may be adjusted. For example, the causal question may be adjusted in response to detecting that a threshold number of samples are to be removed due to the positivity violation. Further, the techniques described herein also enable different types of positivity violation to be identified. For example, internal versus external positivity violations may be detected. Internal positivity violations as used herein refer to positivity violations associated with a particular dataset. External positivity violations as used herein refer to positivity violations that are associated with external causes, such as clinical guidelines.

Moreover, the techniques described herein enable identification and characterization of sub-populations with positivity violations that have multidimensional features. For example, the techniques can scale efficiently with datasets having hundreds of dimensions. In addition, the interactive representation may enable multiple features to be visualized at one time and may be easily scaled to display many features. The tree representations described herein can handle more variables than a table, and rules for each variable are chosen automatically so as to maximize discrimination, rather than being predefined by the user. In addition, an interactive visualization is generated and may be used to explore positivity violations and help a user decide how to resolve the positivity violations.

With reference now to FIG. 1, a block diagram shows an example pipeline for detecting positivity violations in multidimensional data. The example pipeline 100 can be implemented in the computing device 600 of FIG. 6 using the method 500 of FIG. 5.

FIG. 1 includes a feature matrix 102. For example, the feature matrix may have group assignments for a number of features. The pipeline 100 includes a decision tree 104. For example, the decision tree may be based on entropy. The pipeline 100 further includes a significance and consistency testing 106. The pipeline 100 also includes an interactive representation 108. In various examples, the interactive representation 108 may be a bar structure, such as a partition bar. For example, the interactive representation 108 may be the partition bar 300 described in FIG. 3. The pipeline 100 includes a set of positivity problem insights 110. In some examples, the positivity problem insights 110 may be provided in the form of a rule table. For example, the positivity problem insights 110 may be provided using the example rule table 400 described in FIG. 4. The pipeline 100 also further includes a cohort refinement 112.

In the example of FIG. 1, an input file may be received. For example, the data may be a flat file, or any data that can be converted into a flat file. The flat file may be a feature matrix. For example, the feature matrix may include including a set of objects in rows and features in organized into columns. A target feature may be organized as a last column in the feature matrix. For example, the target feature may be a feature whose effects are being targeted in a causality inference. In various examples, the other features may be various attributes of the objects in the rows.

Still referring to FIG. 1, at block 104 a decision tree may be generated based on the feature matrix. For example, the decision tree may be based on the entropy. As one example, the decision tree may be generated using the C4.5 algorithm, first released 1993. Decision trees can gain 100% accuracy on any dataset, but that does not necessarily mean that their prediction is good, as it will probably fail to generalize for out-of-box samples. Similarly, an overfitted tree is one that detects meaningless violations, since each sample can be assigned to a leaf of its own, creating a violation of 1 sample against 0 samples from the other group. Therefore, each decision tree may be properly regularized to avoid overfitting and underfitting. To perform this model selection, a random hyperparameter search may be used in a cross-validation fashion to find hyperparameters that provide best performance on the validation folds. For example, performance may be measured in terms of area under the receiver operating characteristic curve. In some examples, other search paradigms may also be used. The generated decision tree may be used to identify homogenous populations. For example, a homogenous population may include objects that either are all associated or are all not associated with the target attribute. Leaves of the decision tree belonging to the homogenous populations are kept, while leaves that do not belong to the homogenous populations are discarded. The decision tree may thus be used to divide the covariate space into disjoint regions, each region with maximized homogeneity in terms of treatment assignment. Thus, even though a classification algorithm, namely the decision tree algorithm, is used, the classification algorithm is used to cluster particular homogenous sets of objects together rather than classify all the objects. Any population classification of the decision tree is disregarded. Thus, a new use of decision trees for grouping objects is described herein.

In various examples, a number of decision trees may be similarly generated by randomly selecting a predetermined number of objects with various features to construct a forest. For example, a forest of 200 trees may be generated in this manner. In various examples, when constructing a random forest, each tree in the forest should be specified similarly to the main reference tree. This may be done to make all trees comparable, so insights drawn from the forest are also relevant to the main decision tree. The trees are fitted onto a random set of objects and then applied on the whole population. This may be used to detect whether a detected violation is due to overfitting or if it is consistently repeated across many trees in the forest. Since the covariate regions are represented by the tree's leaves, the regions may be characterized intuitively using covariate-level queries defined by the path along the decision tree. For example, for each object, a number may be computed indicating the number of decision trees in which the object was associated with a positivity violation. The resulting numbers may be used to indicate a degree in which each of the objects violates positivity. For example, some objects may only violate positivity in a few decision trees. However, some objects may violate positivity in hundreds of decision trees. In this case, the positivity violation may be detected as being an external violation. For example, the positivity violation may not be inherently related to a data problem, but an external issue, such as an external policy or guideline. In various examples, an external positivity violation may be detected if an object was detect as violating positivity in more than a t a threshold number of decision trees.

At block 106, significance and consistency testing is performed. For example, several metrics may be calculated to check for significance of a positivity violation. As used herein, consistency is a measure for samples. For example, consistency may be calculated by applying the forest on the dataset. An indicator may be placed for each tree and each sample indicating whether that sample was tagged for being a part of a violating subspace by that tree. The consistency of a sample is the fraction of times it was counted as a violation among all the trees in the forest. For example, the consistency may be a number between zero and one. The consistency of a leaf is an aggregation of the consistency of the samples mapped to the leaf. For each leaf in the main tree, the consistency of the samples mapped to that leaf is averaged.

Another metric for testing significance of a positivity violation is a probability metric. A probability metric, as used herein, refers to a measure for leaves, which may be modeled using a hypergeometric distribution. Given two possible interventions A=0; 1, the number of samples from each group in the entire dataset may be denoted as $N_0$; $N_1$ accordingly. As one example, for a given leaf, or a covariate subspace, $n_0$ untreated and $n_1$ treated patients may be assigned as belonging to the given leaf. These samples ($n_0$; $n_1$) originate from the root samples ($N_0$; $N_1$). Therefore, the leaf may be modeled as a sample from the population (root), where the population size $N=N_0+N_1$, the number of successes in the population $K=N_1$, the number of draws $n=n_0+n_1$, and the number of observed successes $k=n_1$, and where the probability of the leaf is the probability mass function:

$$\text{Metric}_{probability}=Pr[X=k] \text{ given } X \sim \text{Hypergeometric } (N,k,n) \quad \text{Eq. 1}$$

The smaller the probability the rarer it is to get that subspace by chance. Therefore, in some examples, positivity violations may be detected in response to detecting that a threshold probability is not exceeded. For example, the lower the probability the more likely that an event is not likely to happen by chance and may therefore be detected as a positivity violation.

A third metric that may be used is prediction performance In various examples, an overall sense of the severity of the violations can be obtain by testing the prediction performance of a classification. This can be done by applying any of numerous classification metrics suitable for machine learning. Counterintuitively, in contrast to usual machine learning, a target score in this case may be one suggesting the classifier is no better than a random coin flip. For example, the target score may be a zero-one loss or area under the receiver operating curve of 0.5. Random-like prediction performance can provide a hint that the covariates of the two intervention groups overlap and cannot be discriminated from each other.

In some examples, positivity violations may be soft positivity violations. For example, soft positivity violations may be detected based on impurity measures, including either entropy: $-\Sigma_i p_i \log p_i$, or gini: $1-\Sigma_i p_i^2$. The advantage of these impurity measures is that they are invariant to whether imbalance was caused due to $n_0 \gg n_1$ or $n_1 \gg n_0$. In various examples, to obtain a strict classical positivity, a tree may be tuned to tag every leaf with impurity-measure of zero, which suggests either n0=0 or n1=0. However, as explained above, a focus may be placed on subspaces where unbalancing is simply large. For example, the ratio $n_1/n_0$ may be either very large or very small. This can be obtained by setting some small positive threshold t, for which leaves with impurity up to this threshold may be tagged as violating positivity.

In some examples, positivity violations may be relative positivity violations, also referred to herein as soft violations. For example, in some examples, treatment prevalence may be low in the overall population. For example, $N_1 < N_0$. In such cases, what is regarded as a soft violation may thus be adjusted according to the overall prevalence rate. In various examples, denoting an impurity measure H, H(root) may be compared to H(leaf). Specifically, a condition H(root)−H(leaf)>t, for a small positive to, may be calculated in order to determine whether to tag out a leaf. In some examples, by enforcing a positive difference (i.e. H(leaf)>H (root))), the leaf may be more heterogenic than the overall population root. Given a desired threshold t from above, the threshold t can accordingly be transformed into threshold t̂ using the equation:

$$\hat{t}=\max\{H(\text{root})-t,0\} \quad \text{Eq. 2}$$

At block 108, an interactive representation of the decision trees is generated. For example, the interactive representation may be a partition bar. The interactive representation may be used to explore the leaves to obtain more details about the subspaces they represent, as described above. As one example, the interactive representation is built out of fixed-height rectangles. Each such rectangle represents a leaf, which width corresponding to the number of samples it contains and the y-axis location to its depth. Therefore, the entire of the x-axis represents all the samples in the datasets, grouped by their corresponding leaves; and shallower leaves in the tree are lower on the y-axis. In various examples, each treatment group may be assigned its own color. The color of a leaf is the color associated with the majority group mapped to the leaf. In some examples, additional color opacity may be determined by the average consistency values of the samples belonging to the leaf. The aggregation is not limited to an average. In some examples, the aggregation may also be a median or any other summary statistic over the consistency values.

In various examples, a largeness, consistency, and simplicity of important subspaces may be represented by combining shaping and coloring. For example, a larger subspace may be indicated using wider rectangles. A more consistent subspace may be represented using more opaque colors. A simpler subspace may be indicated using fewer features in defining the subspace. Thus, if a leaf is shallow in the tree, it may be closer to the axes. By contrast, unimportant subspaces may be depicted as transparent or small (negligible) rectangles. In this way, the more eye-catching the plot is, the more severe positivity violations are in the dataset. Therefore, an ideal dataset may be represented as a blank plot. In this way, an interactive representation is made that is scalable to multiple trees without losing information and interactivity between trees.

At block 110, positivity problem insights are generated. For example, a subspace may be characterized using rule extraction and a rule table generated. As one examples, given a leaf, a characterization of the subspace defined by the leaf may be generated using the following algorithm for extracting covariate-level characterization from a decision tree leaf, characterizing the samples belonging to the covariate subspace corresponding to that leaf:

---
Data: A tree T, a desired leaf l.
Result: A covariate-level query Q defining the subspace corresponding to l.
Initialize empty query Q.
traverse from root node T(root) to leaf l:
for each node k along the path do
    Let $X_i$ be the covariate inquired for split on node k
    Let c be the cutoff for that split
    Let $s \in \{\leq, >\}$ be the sign used to split
    Update $Q = Q \wedge (X_i s c)$
end
---

Since a decision tree can reuse covariates in different depths of the tree, a subspace query may have redundant rules. For example, $x_3 > 0 \wedge x_3 > 1$ that can be simply formatted as $x_3 > 1$. In various examples, query pruning can be applied to simplify such repetitions. For example, when encountering a repeated rule in terms of both covariate and cutoff sign, the rule closer to the leaf may be kept, while the rule closer to the tree root may be discarded. Keeping rules closer to the leaf may ensure that rules kept are more specific to the subspace, as rules are more general the closer they are to the root. In various examples, the rules may be included in a rule table, such as the example rule table 400 of FIG. 4.

At block 112, a cohort refinement 112 is performed. For example, one or more identified subpopulations may be excluded from a cohort. In various example, if a threshold number of samples are to be excluded from the cohort, then a hypothesis to be tested may be modified. For example, the data set may not include enough variety of samples in order to accurately test the hypothesis via a causal machine learning algorithm without positivity violations. In various examples, the refined cohort may then be sent to a casual machine learning algorithm for further processing.

It is to be understood that the block diagram of FIG. 1 is not intended to indicate that the pipeline 100 is to include all of the components shown in FIG. 1. Rather, the pipeline 100 can include fewer or additional components not illustrated in FIG. 1 (e.g., additional client devices, or additional resource servers, etc.).

Figure 2:
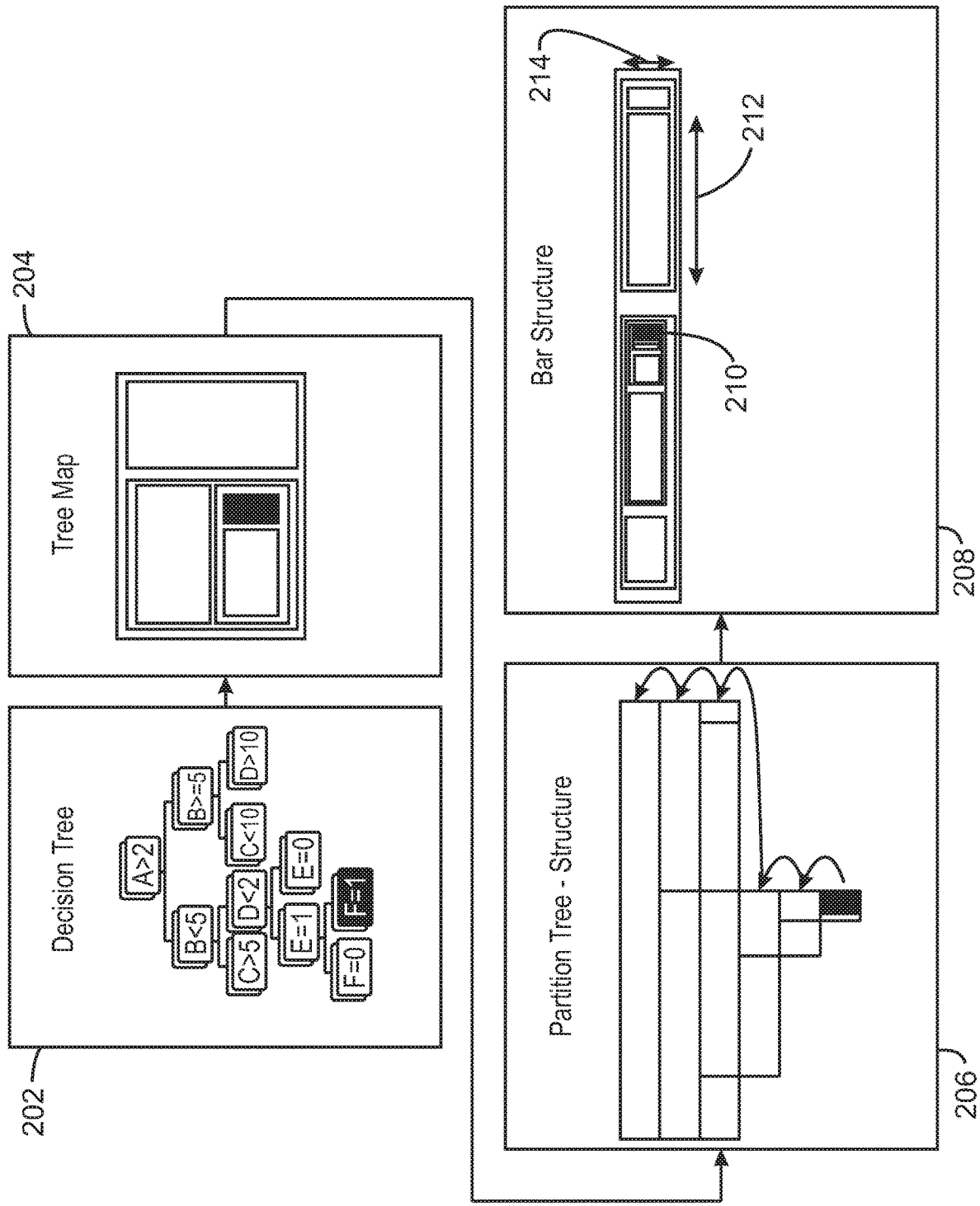
FIG. 2 is an example process for generating a bar structure according to embodiments described herein.

FIG. 2 is an example process for generating a bar structure according to embodiments described herein. The process 200 can be performed using the method 500 by the computing device 600 of FIG. 6 or the pipeline 100 of FIG. 1 and can be used to generate the bar structure 300 of FIG. 4.

At block 202, a decision tree is received. For example, the decision tree may have been generated using the techniques described in FIG. 1.

At block 204, a tree map is generated based on the decision tree. For example, the tree map may be a space filling representation of the same data in the decision tree.

At block 206, a partition tree-structure is generated based on the tree map. For example, the partition tree-structure is a linear construction.

At block 208, a bar structure is generated based on the partition tree-structure. For example, the bar structure may be generated by flattening the partition tree-structure, while preserving relative position and size. In some examples, area may be compensated for padding. The coloring of the bars may indicate whether there is a positivity violation or not. For example, a colored bar 210 may indicate a positivity violation. A white bar may indicate no positivity violation. In some examples, the hue of bar colors may indicate a particular treatment class. In some examples, the intensity of the bar colors may represent a consistency. For example, the consistency may be used to distinguish internal versus external positivity violations. In various examples, the width 212 of each of the bars may indicate a population size represented by each of the bars. In various example, the height 214 of each of the bars in the bar structure may indicate the hierarchy level of each of the bars. Thus, although the colored bar 210 may have a positivity violation indicated by its color, the population size as indicated by its width is small.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional features, or additional resource servers, etc.).

Figure 3:
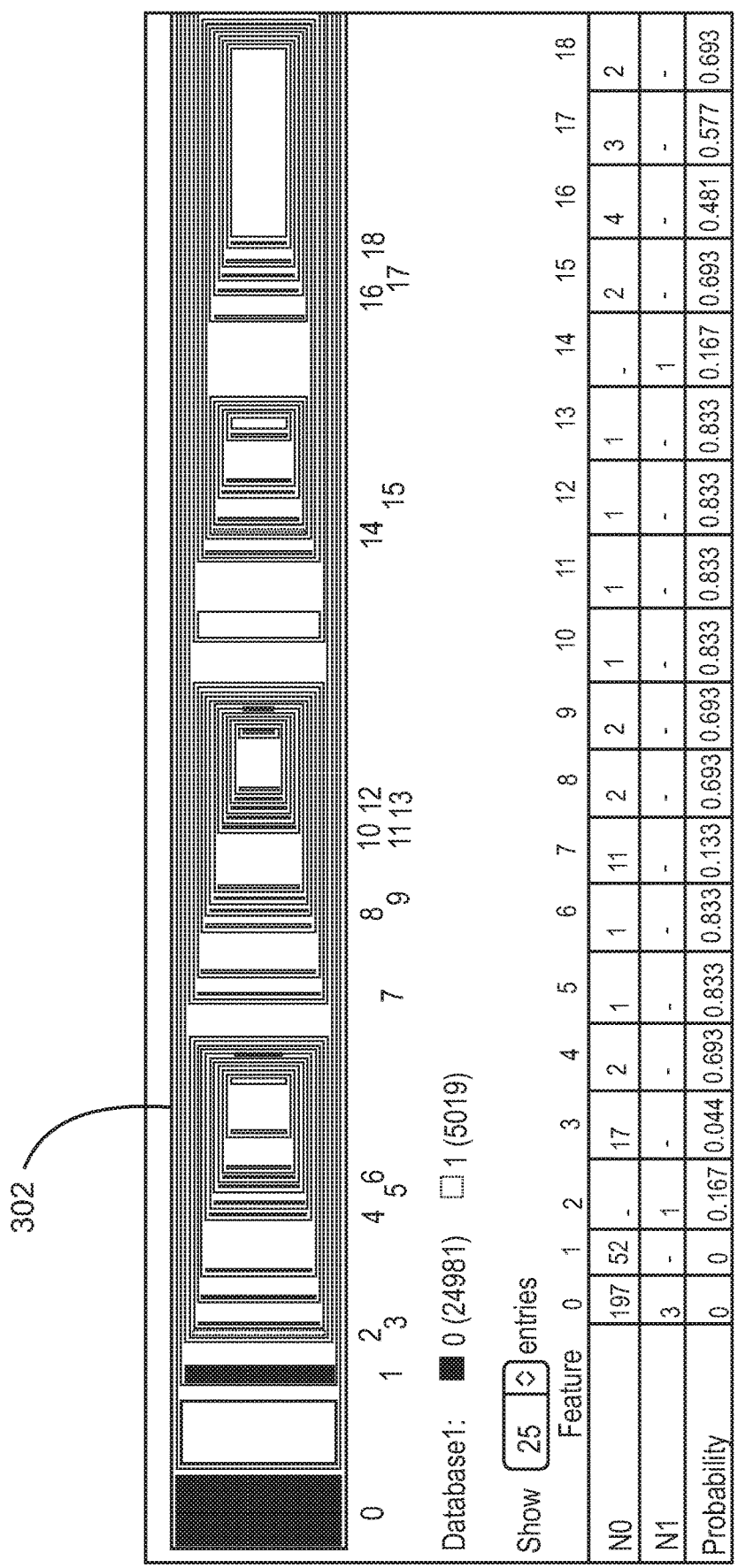
FIG. 3 is an example partition bar according to embodiments described herein.

FIG. 3 is an example partition bar according to embodiments described herein. The partition bar 300 may be generated via the computing device 600 of FIG. 6 or the pipeline 100 of FIG. 1 using the process 200 of FIG. 2.

The partition bar 300 visualization aims to highlight the most meaningful subspaces violating positivity. The partition bar 300 allows an easy overview of the scale and severity of positivity violations in a dataset. In some examples, an interactive version of the partition bar may also allow a more thorough investigation into the subspaces to obtain additional information.

In the example partition bar 300 of FIG. 3, a set of 19 different object groups are shown as interleaving bars in a hierarchy of bars within the block 302. The width of each bar indicates the relative number of contained objects, and the height corresponds to the level in the hierarchy of rules. The hierarchy levels indicate the sequence of rules (feature conditions) used to select a particular object group. Groups of objects violating positivity are numbered from 0-18. The number of each of the bars correspond to a set of features displayed below the block 302. Two different treatment classes N0 and N1 are indicated by different hues, represented as filled bars and empty bars with dotted lines, respectively. White bars indicate groups without any treatment classes. Additional information below the block 302 of the partition bar 300 includes probabilities for each of the features.

It is to be understood that the block diagram of FIG. 3 is not intended to indicate that the partition bar 300 is to include all of the components shown in FIG. 3. Rather, the partition bar 300 can include fewer or additional components not illustrated in FIG. 3 (e.g., additional bars, or additional features, treatment classes, etc.).

Figure 4:
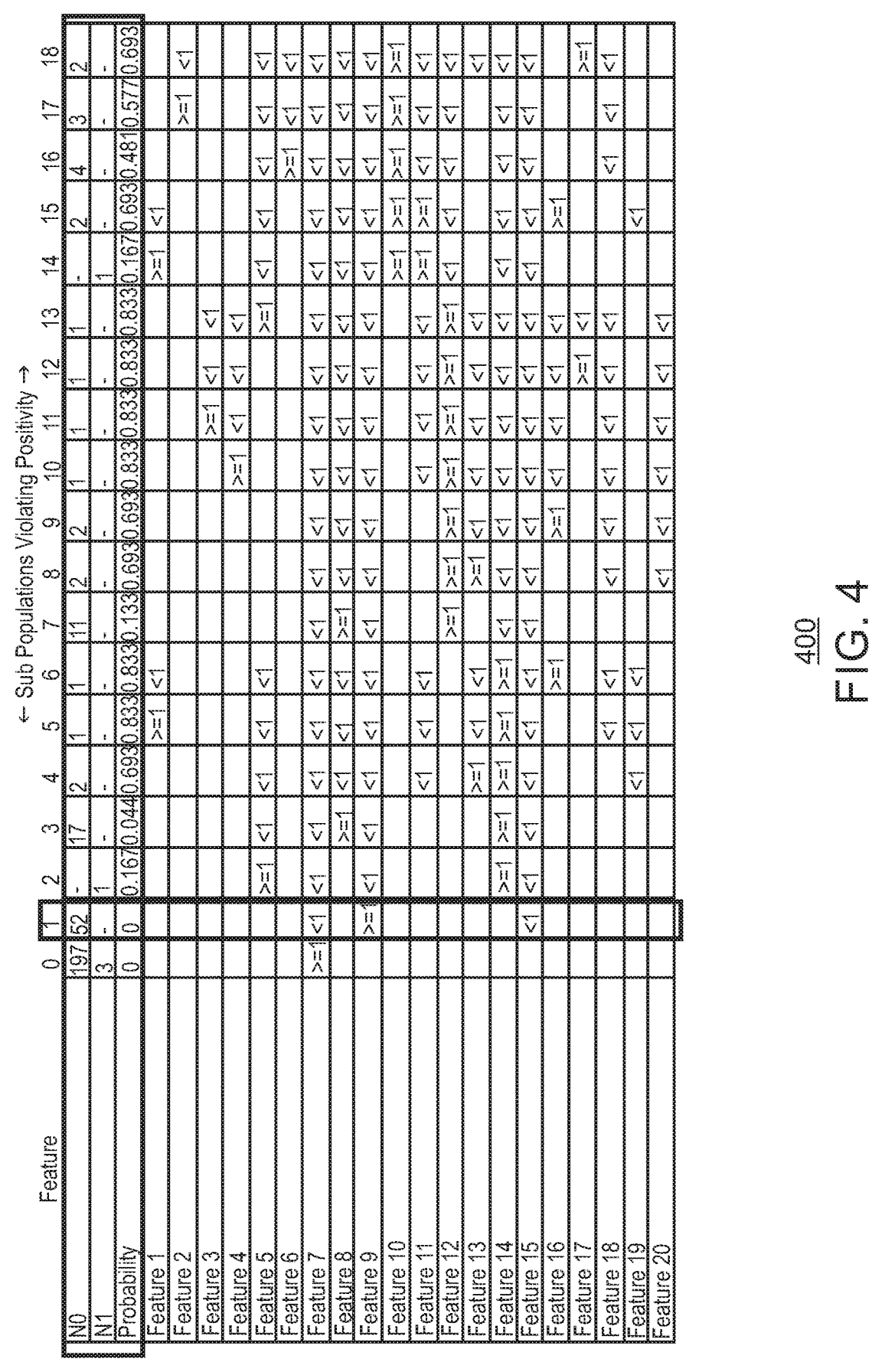

FIG. 4 is an example rule table according to embodiments described herein. The rule table 400 may be generated via the computing device 600 of FIG. 6 using the pipeline 100 of FIG. 1 or the method 500 of FIG. 5.

FIG. 4 shows a set of rows including 20 features, two treatment classes, and a probability metric. For example, the probability metric may be calculated using Eq. 1 discussed in FIG. 1. A set of columns includes a set of 19 detected sub populations violating positivity. The values in the rule table 400 are rules made by the decision tree. For example, subgroup 0 is characterized by having its feature 8 value larger or equal to 1, meaning every object with feature 8 larger or equal to 1 is considered subgroup 0. Column 1 is highlighted since it is both significant and a hard violation. A significant sub population may be any sub population with a probability of 0. A hard violation, as used herein, refers to a positivity violation in which no objects of a group appear in the sub population. For example, there are only objects from the control group 0 and no objects from the test group 1 in the sub population of column 1.

It is to be understood that the block diagram of FIG. 4 is not intended to indicate that the rule table 400 is to include all of the components shown in FIG. 4. Rather, the rule table 400 can include fewer or additional components not illustrated in FIG. 4 (e.g., additional features, or additional sub populations violating positivity, treatment classes, etc.).

Figure 5:
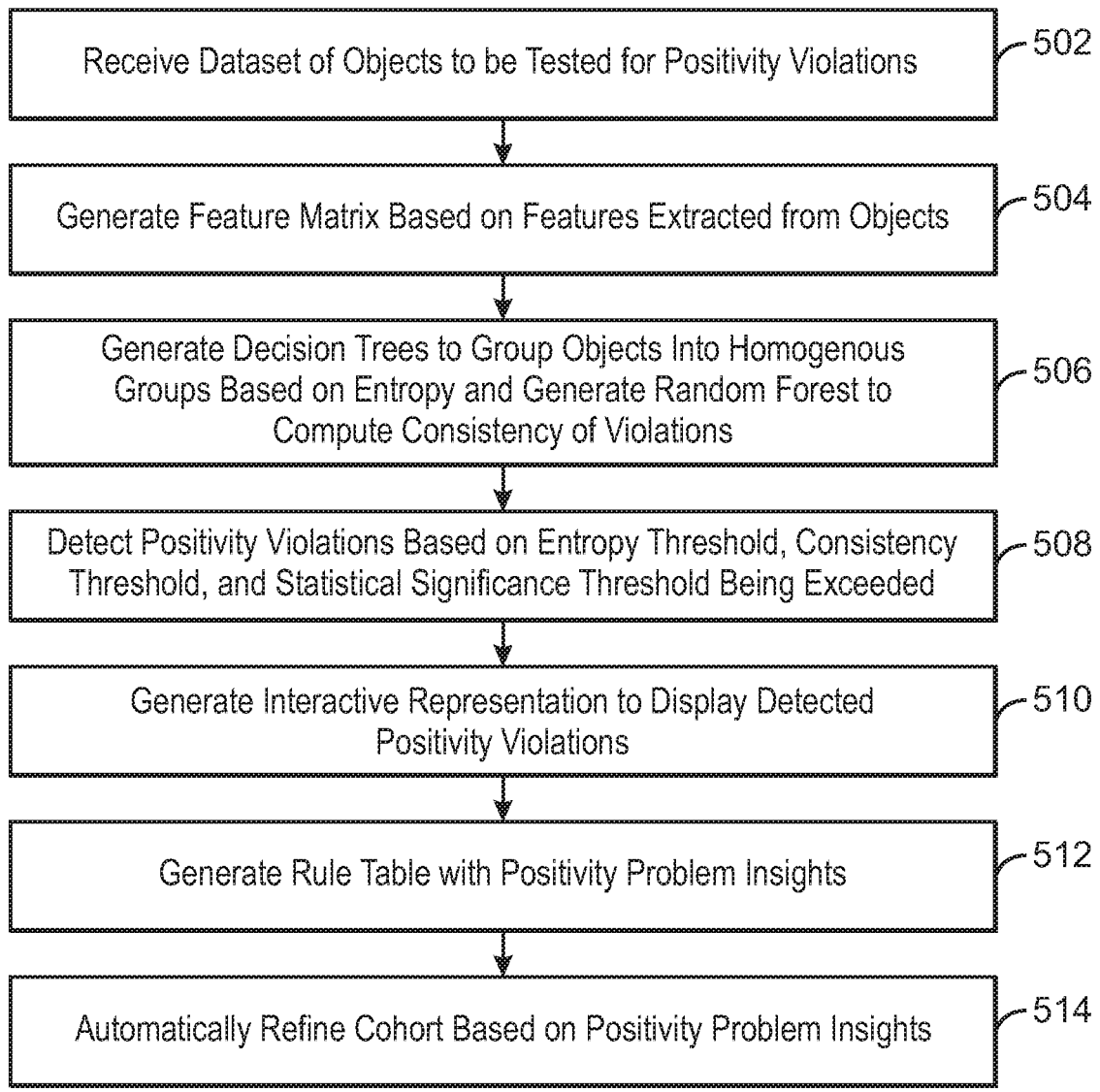
FIG. 5 is a block diagram of an example method that can detect positivity violations in multidimensional data.

FIG. 5 is a process flow diagram of an example method that can detect positivity violations in multidimensional data. The method 500 can be implemented with any suitable computing device, such as the computing device 600 of FIG. 6 and is described with reference to the pipeline 100 of FIG. 1.

At block 502, a dataset of objects to be tested for positivity violations is received. For example, the objects may be patients.

At block 504, a feature matrix is generated based on features extracted from the objects. In some examples, the feature matrix may have group assignment. For example, the group assignment may be to a control group or to a test group.

At block 506, a decision tree is generated to group the objects into homogenous groups based on entropy and generate a random forest to compute consistency of violations. For example, the random forest may be generated by randomly sampling a predetermined number of objects with various features. The decision tree may then be used to detect sub-populations with high or low entropy, indicating homogeneous groups. Moreover, the population classification of the decision tree is disregarded. Thus, a new use of decision trees for grouping objects is described herein.

At block 508, positivity violations are detected based on an entropy threshold, a consistency threshold, and a statistical significance threshold being exceeded. In various examples, a type of the positivity violations is detected based on a consistency threshold number of trees. For example, the positivity violation may be detected as an external positivity violation in response to detecting that a consistency threshold of a number of trees including an object has been exceeded. In some examples, the positivity violation may be detected as an internal positivity violation in response to detecting that a consistency threshold number of groups including an object has not been exceeded. In various examples, a positivity violation may also be detected based on a probability modeled using a hypergeometric distribution. For example, groups having a probability below a threshold may be treated as positivity violations. In some examples, a positivity violation may also be detected based on a prediction performance metric.

At block 510, an interactive representation is generated to display detected positivity violations. For example, the interactive representation may be a partition bar, such as the partition bar 300 of FIG. 3.

At block 512, a rule table with positivity problem insights is generated. For example, the rule table may include a set of sub populations violating positivity, a set of features, a set of treatment classes, and probabilities. In various examples, the decision tree may provide explainable and interpretable definitions of the subpopulation by showing a hierarchy of rules leading to the group. These rules may be organized into the rule table.

At block 514, a cohort is automatically refined based on the positivity problem insights. For example, one or more objects may be removed from the cohort to reduce positivity violations.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

In some scenarios, the techniques described herein may be implemented in a cloud computing environment. As discussed in more detail below in reference to at least FIGS. 6-9, a computing device configured to detect positivity violations may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
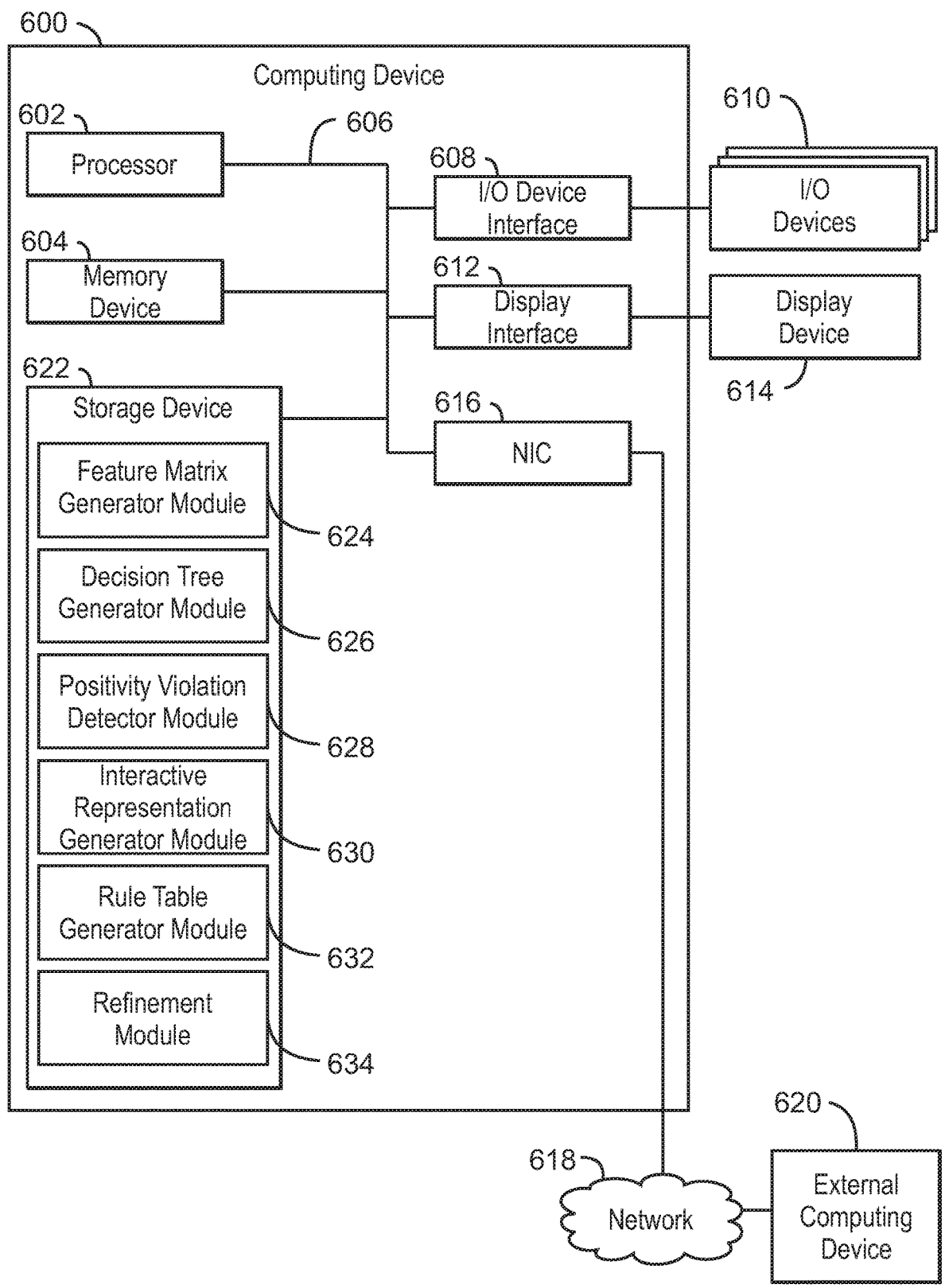
FIG. 6 is a block diagram of an example computing device that can detect positivity violations in multidimensional data.

FIG. 6 is block diagram of an example computing device that can detect positivity violations in multidimensional data. The computing device 600 may be for example, a server, desktop computer, laptop computer, tablet computer, or smartphone. In some examples, computing device 600 may be a cloud computing node. Computing device 600 may be described in the general context of computer system executable instructions, such as program modules, being executed by a computer system. Generally, program modules may include routines, programs, objects, components, logic, data structures, and so on that perform particular tasks or implement particular abstract data types. Computing device 600 may be practiced in distributed cloud computing environments where tasks are performed by remote processing devices that are linked through a communications network. In a distributed cloud computing environment, program modules may be located in both local and remote computer system storage media including memory storage devices.

The computing device 600 may include a processor 602 that is to execute stored instructions, a memory device 604 to provide temporary memory space for operations of said instructions during operation. The processor can be a single-core processor, multi-core processor, computing cluster, or any number of other configurations. The memory 604 can include random access memory (RAM), read only memory, flash memory, or any other suitable memory systems.

The processor 602 may be connected through a system interconnect 606 (e.g., PCI®, PCI-Express®, etc.) to an input/output (I/O) device interface 608 adapted to connect the computing device 600 to one or more I/O devices 610. The I/O devices 610 may include, for example, a keyboard and a pointing device, wherein the pointing device may include a touchpad or a touchscreen, among others. The I/O devices 610 may be built-in components of the computing device 600, or may be devices that are externally connected to the computing device 600.

The processor 602 may also be linked through the system interconnect 606 to a display interface 612 adapted to connect the computing device 600 to a display device 614. The display device 614 may include a display screen that is a built-in component of the computing device 600. The display device 614 may also include a computer monitor, television, or projector, among others, that is externally connected to the computing device 600. In addition, a network interface controller (NIC) 616 may be adapted to connect the computing device 600 through the system interconnect 606 to the network 618. In some embodiments, the NIC 616 can transmit data using any suitable interface or protocol, such as the internet small computer system interface, among others. The network 618 may be a cellular network, a radio network, a wide area network (WAN), a local area network (LAN), or the Internet, among others. An external computing device 620 may connect to the computing device 600 through the network 618. In some examples, external computing device 620 may be an external web-server 620. In some examples, external computing device 620 may be a cloud computing node.

The processor 602 may also be linked through the system interconnect 606 to a storage device 622 that can include a hard drive, an optical drive, a USB flash drive, an array of drives, or any combinations thereof. In some examples, the storage device may include a feature matrix generator module 624, a decision tree generator module 626, a positivity violation detector module 628, an interactive representation generator module 630, a rule table generator module 632, and a refinement module 634. The feature matrix generator module 624 can receive a feature matrix including a number of features associated with a number of objects to be tested for positivity violations. In some examples, the number of features is greater than three. The decision tree generator module 626 can generate a decision tree to group the objects into homogenous groups based on entropy and generate a random forest to compute consistency of violations. For example, a population classification of the decision tree is disregarded. The positivity violation detector module 628 can detect a positivity violation based on an entropy threshold, a consistency threshold, and a statistical significance threshold being exceeded. The positivity violation detector module 628 can detect the positivity violation is an external positivity violation in response to detect that a threshold number of trees including an object has been exceeded and detect the positivity violation is an internal positivity violation in response to detecting that a threshold number of trees including an object has not been exceeded. In various examples, the positivity violation detector module 628 can detect a positivity violation based on a probability modeled using a hypergeometric distribution. In some examples, the positivity violation detector module 628 can detect a positivity violation based on a prediction performance metric. In various examples, the positivity violation detector module 628 can detect a soft violation in response to detecting an impurity measure does not exceed an impurity threshold. In some examples, the positivity violation detector module 628 can detect a relative positivity violation in response to detecting a threshold adjusted according to an overall prevalence rate is not exceeded. The interactive representation generator module 630 can generate an interactive representation to display the positivity violation. For example, the interactive representation may be visualization including a subset of the number of objects associated with the positivity violation, a set of rules based on the decision tree, and the computed consistency for the subset. As one examples, the interactive representation may be a partition bar. In various examples, a hue of bar colors in the partition bar indicates a particular treatment class. In some examples, an intensity of bar colors in the partition bar indicate consistency. In various examples, a width of bars in the partition bar indicate a population size of a group. In some examples, a height of bars in the partition bar indicate a hierarchy level of each of the bars. The rule table generator module 632 can generate a rule table with positivity problem insights. The refinement module 634 can automatically refine a cohort based on the positivity problem insights.

It is to be understood that the block diagram of FIG. 6 is not intended to indicate that the computing device 600 is to include all of the components shown in FIG. 6. Rather, the computing device 600 can include fewer or additional components not illustrated in FIG. 6 (e.g., additional memory components, embedded controllers, modules, additional network interfaces, etc.). Furthermore, any of the functionalities of the feature matrix generator 624, the decision tree generator module 626, the positivity violation detector module 628 interactive representation generator module 630, the rule table generator module 632, and the refinement module 634 may be partially, or entirely, implemented in hardware and/or in the processor 602. For example, the functionality may be implemented with an application specific integrated circuit, logic implemented in an embedded controller, or in logic implemented in the processor 602, among others. In some embodiments, the functionalities of the feature matrix generator module 624, the decision tree generator module 626, the positivity violation detector module 628 interactive representation generator module 630, the rule table generator module 632, and the refinement module 634 can be implemented with logic, wherein the logic, as referred to herein, can include any suitable hardware (e.g., a processor, among others), software (e.g., an application, among others), firmware, or any suitable combination of hardware, software, and firmware.

Figure 7:
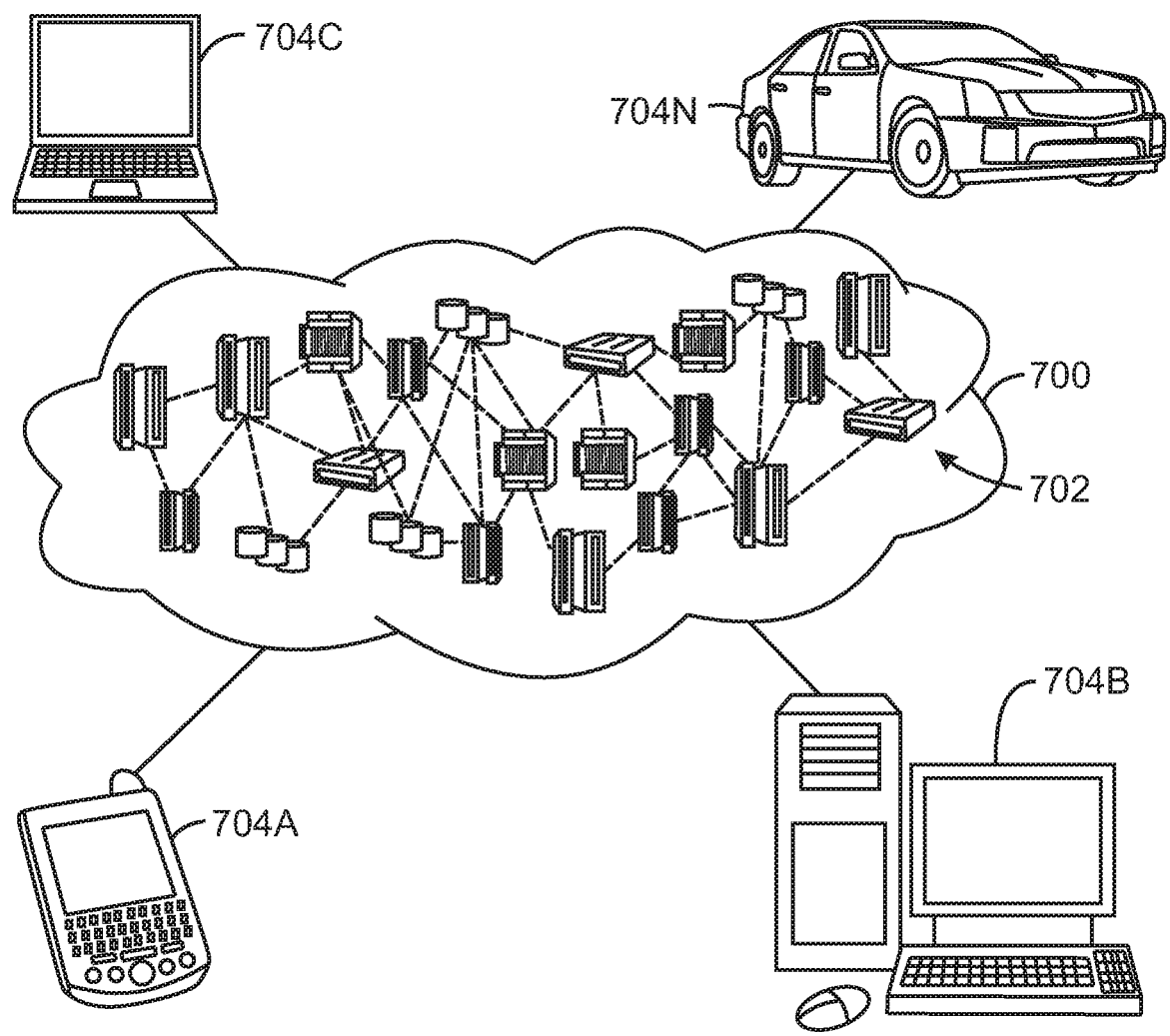
FIG. 7 is a process flow diagram of an example cloud computing environment according to embodiments described herein.

Referring now to FIG. 7, illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704A, desktop computer 704B, laptop computer 704C, and/or automobile computer system 704N may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704A-N shown in FIG. 7 are intended to be illustrative only and that computing nodes 702 and cloud computing environment 700 can communicate with any type of computerized device over any type of network and/or network addressable connection (e.g., using a web browser).

Figure 8:
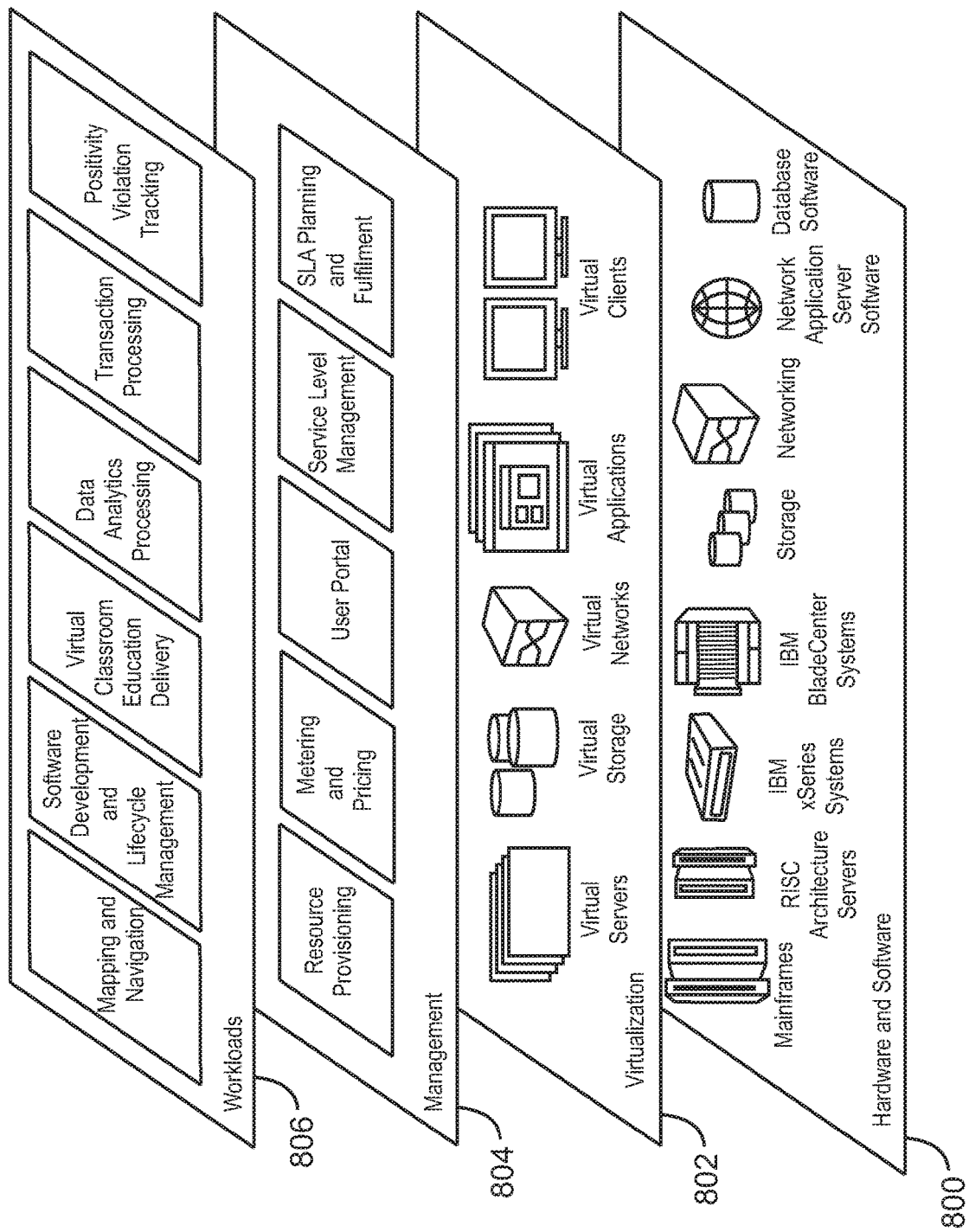
FIG. 8 is a process flow diagram of an example abstraction model layers according to embodiments described herein.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 800 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 802 provides an abstraction layer from which the following examples of virtual entities may be provided: virtual servers; virtual storage; virtual networks, including virtual private networks; virtual applications and operating systems; and virtual clients. In one example, management layer 804 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 806 provides examples of functionality for which the cloud computing environment may be utilized. Examples of workloads and functions which may be provided from this layer include: mapping and navigation; software development and lifecycle management; virtual classroom education delivery; data analytics processing; transaction processing; and positivity violation tracking.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
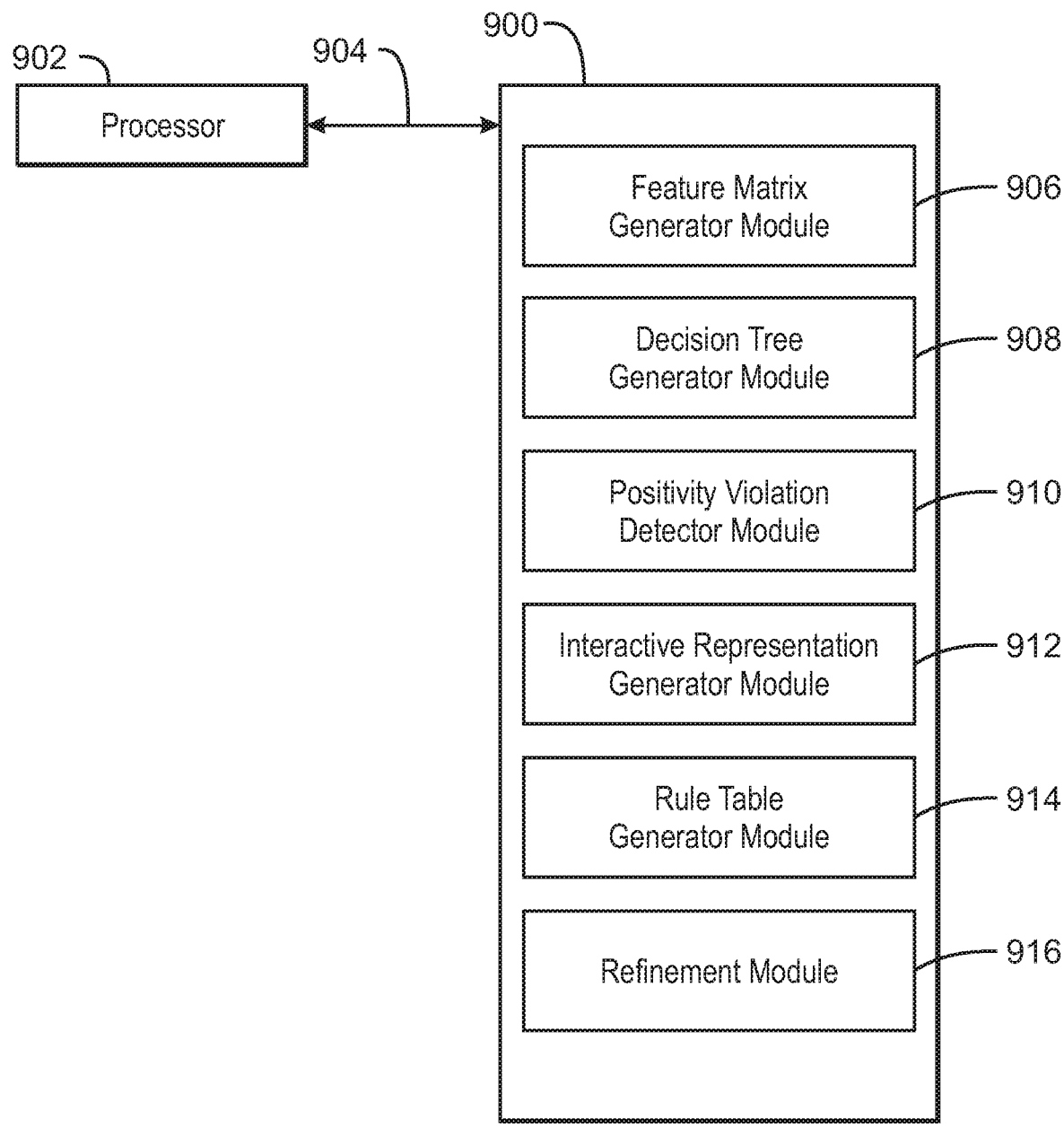
FIG. 9 is an example tangible, non-transitory computer-readable medium that can detect positivity violations in multidimensional data.

Referring now to FIG. 9, a block diagram is depicted of an example tangible, non-transitory computer-readable medium 900 that can detect positivity violations in multi-dimensional data. The tangible, non-transitory, computer-readable medium 900 may be accessed by a processor 902 over a computer interconnect 904. Furthermore, the tangible, non-transitory, computer-readable medium 900 may include code to direct the processor 902 to perform the operations of the method 500 of FIG. 5 above.

The various software components discussed herein may be stored on the tangible, non-transitory, computer-readable medium 900, as indicated in FIG. 9. For example, a feature matrix module 906 includes code to receive a dataset of objects to be tested for positivity violations. The feature matrix module 906 also includes code to generate a feature matrix based on features extracted from the objects. In some examples, the feature matrix module 906 includes code to. In some examples, the feature matrix module 906 includes code to. A decision tree generator module 908 includes code to generate a decision tree to group the objects into homogenous groups based on entropy and generate a random forest to compute consistency of violations. A positivity violation detector module 910 includes code to detect a positivity violation based on an entropy threshold, a consistency threshold, and a statistical significance threshold being exceeded. The positivity violation detector module 910 also includes code to detect the positivity violation is an external positivity violation in response to detect that a consistency threshold number of trees including an object has been exceeded and detect the positivity violation is an internal positivity violation in response to detecting that a consistency threshold number of trees including an object has not been exceeded. In various examples, the positivity violation detector module 910 also includes code to detect a positivity violation based on a probability modeled using a hypergeometric distribution. In some examples, the positivity violation detector module 910 also includes code to detect a positivity violation based on a prediction performance metric. In various examples, the positivity violation detector module 910 further includes code to detect a soft violation in response to detecting an impurity measure does not exceed an impurity threshold. In some examples, the positivity violation detector module 910 further includes code to detect a relative positivity violation in response to detecting a threshold adjusted according to an overall prevalence rate is not exceeded. An interactive representation generator module 912 includes code to generate an interactive representation to display the positivity violation. A rule table generator module 914 includes code to generate a rule table with positivity problem insights. A refinement module 916 includes code to automatically refine a cohort based on the positivity problem insights. It is to be understood that any number of additional software components not shown in FIG. 9 may be included within the tangible, non-transitory, computer-readable medium 900, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 9 may be included within the tangible, non-transitory, computer-readable medium 900, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting and displaying positivity violations, comprising a processor to:
receive a feature matrix comprising a plurality of features associated with a plurality of objects to be tested for positivity violations;
generate a decision tree to group the objects into homogenous groups based on entropy and generate a random forest to compute consistency of violations;
detect a positivity violation based on an entropy threshold, a consistency threshold, and a statistical significance threshold being exceeded;
generate a tree map based on the decision tree, wherein the tree map comprises a space filling representation of data in the decision tree;
generate a partition tree-structure comprising a linear construction based on the tree map; and
display the positivity violation an interactive representation comprising a partition bar by flattening the partition tree-structure while preserving relative position and size, wherein a colored bare of the partition bar indicates the positivity violation and a height of each bar indicates a hierarchy level corresponding to feature conditions used to select a particular homogenous group of objects.

2. The system of claim 1, wherein a non-homogenous population classification of the decision tree is disregarded.

3. The system of claim 1, wherein the interactive representation comprises a visualization including a subset of the plurality of objects associated with the positivity violation, a set of rules based on the decision tree, and the computed consistency for the subset.

4. The system of claim 1, wherein a hue of bar colors in the partition bar indicates a particular treatment class.

5. The system of claim 1, wherein an intensity of bar colors in the partition bar indicate consistency.

6. The system of claim 1, wherein a width of bars in the partition bar indicate a population size of a group.

7. A computer-implemented method, comprising:
receiving, via a processor, a dataset of objects to be tested for positivity violations;
generating, via the processor, a feature matrix based on features extracted from the objects;
generating, via the processor, decision trees to group the objects into homogenous groups based on entropy and generate a random forest to compute consistency of violations;
detecting, via the processor, a positivity violation based on an entropy threshold, a consistency threshold, and a statistical significance threshold being exceeded;
generating, via the processor, a tree map based on the decision tree, wherein the tree map comprises a space filling representation of data in the decision tree;

generating, via the processor, a partition tree-structure comprising a linear construction based on the tree map; and displaying the positivity violation an interactive representation comprising a partition bar by flattening, via the processor, the partition tree-structure while preserving relative position and size, wherein a colored bar of the partition bar indicates the positivity violation and a height of each bar indicates a hierarchy level corresponding to feature conditions used to select a particular homogenous group of objects.

8. The computer-implemented method of claim 7, comprising detecting the positivity violation is an external positivity violation in response to detecting that the consistency threshold of a number of trees including an object has been exceeded.

9. The computer-implemented method of claim 7, comprising detecting the positivity violation is an internal positivity violation in response to detecting that the consistency threshold of a number of groups including an object has not been exceeded.

10. The computer-implemented method of claim 7, comprising detecting a positivity violation based on a probability modeled using a hypergeometric distribution.

11. The computer-implemented method of claim 7, comprising detecting a positivity violation based on a prediction performance metric.

12. The computer-implemented method of claim 7, comprising generating a rule table with positivity problem insights.

13. The computer-implemented method of claim 12, comprising automatically refining a cohort based on the positivity problem insights.

14. A computer program product for detecting positivity violations, the computer program product comprising a computer-readable storage medium having program code embodied therewith, wherein the computer-readable storage medium is not a transitory signal per se, the program code executable by a processor to cause the processor to:

receive a dataset of objects to be tested for positivity violations;

generate a feature matrix based on features extracted from the objects;

generate decision trees to group the objects into homogenous groups based on entropy and generate a random forest to compute consistency of violations;

detect a positivity violation based on an entropy threshold, a consistency threshold, and a statistical significance threshold being exceeded;

generate a tree map based on the decision tree, wherein the tree map comprises a space filling representation of data in the decision tree;

generate a partition tree-structure comprising a linear construction based on the tree map; and display the positivity violation an interactive representation comprising a partition bar by flattening the partition tree-structure while preserving relative position and size, wherein a colored bar of the partition bar indicates the positivity violation and a height of each bar indicates a hierarchy level corresponding to feature conditions used to select a particular homogenous group of objects.

15. The computer program product of claim 14, further comprising program code executable by the processor to detect the positivity violation is an external positivity violation in response to detect that the consistency threshold number of trees including an object has been exceeded or detect the positivity violation is an internal positivity violation in response to detecting that the consistency threshold number of trees including an object has not been exceeded.

16. The computer program product of claim 14, further comprising program code executable by the processor to detect a positivity violation based on a probability modeled using a hypergeometric distribution.

17. The computer program product of claim 14, further comprising program code executable by the processor to detect a positivity violation based on a prediction performance metric.

18. The computer program product of claim 14, further comprising program code executable by the processor to detect a soft violation in response to detecting an impurity measure does not exceed an impurity threshold.

19. The computer program product of claim 14, further comprising program code executable by the processor to detect a relative positivity violation in response to detecting a threshold adjusted according to an overall prevalence rate is not exceeded.

* * * * *